June 21, 1949. S. SMITH 2,474,016

ROLLER BEARING ASSEMBLY

Filed May 16, 1945

INVENTOR.
SYDNEY SMITH
BY Albert Sperry.
ATTORNEY

Patented June 21, 1949

2,474,016

UNITED STATES PATENT OFFICE 2,474,016

ROLLER BEARING ASSEMBLY

Sydney Smith, Lawrenceville, N. J.

Application May 16, 1945, Serial No. 593,995

2 Claims. (Cl. 308—213)

My invention relates to roller bearings and particularly to constructions wherein a complement of rollers are arranged in engagement with a race ring and are held in place by retaining means so as to provide an assembly which may be handled and shipped as a unit for application to a complementary race ring or bearing member.

Roller bearing assemblies of the type to which my invention relates have generally been of two different types, namely: those in which the race ring is provided with retaining means which are integral with the ring or otherwise fixed with respect thereto and extend inward over the ends of the rollers to prevent longitudinal and radial displacement of the rollers, and those in which the rollers are provided with a groove near the center thereof in which a retaining ring or band is located for holding the rollers in engagement with the race.

Those constructions in which the retaining means are integral with the race ring are expensive to produce since they require special machining operations for forming the retaining means or for securing it in place. Moreover, it is frequently difficult to insert the rollers into a race ring which embodies fixed retaining means and it is often impossible to remove the rollers from the race ring after they have once been assembled. On the other hand, those assemblies in which the rollers are provided with a groove in the center thereof are objectionable because the rollers are weakened in the area of the groove and tend to break if the rollers are twisted or skewed through even a very small angle. This is particularly true if the roller is relatively long and of small diameter as in the case of "needle bearings." Moreover, the grooves in the rollers reduce the area of the bearing surface of the rollers and have a tendency to score the race over which they rotate.

In accordance with my invention these objections to constructions of the prior art are overcome and a novel type of retaining means provided which is inexpensive to produce and permits ready assembly and disassembly of the rollers and race ring. At the same time the rollers employed present an unbroken bearing surface which provides the maximum strength of the rollers. In the preferred form of my invention herein shown and described, the race ring is formed with marginal flanges which project radially at opposite ends of the race to prevent longitudinal displacement of the rollers, while the rollers used are provided with ends of reduced diameter and spring rings are located adjacent the flanges on the race and in engagement with the reduced ends of the rollers to prevent radial displacement of the rollers.

One of the objects of my invention is to provide a novel type of roller bearing assembly adapted to be handled and shipped as a unit for application to a complementary race ring or bearing member.

Another object of my invention is to reduce the cost of roller bearing and race ring assemblies.

A particular object of my invention is to provide a novel form of bearing, race ring, and retaining means assembly which may be readily assembled and disassembled.

These and other objects and features of my invention will appear from the following description thereof in which reference is made to the figures of the accompanying drawing.

Figure 1:
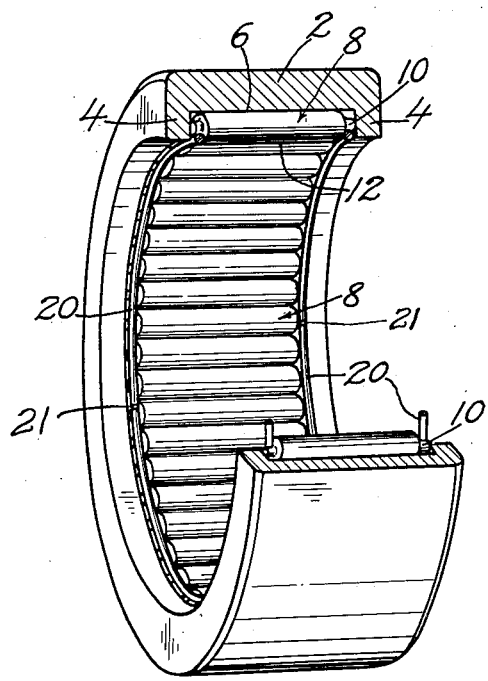
Fig. 1 is a perspective of a typical bearing embodying my invention with part thereof broken away.
Figure 2:
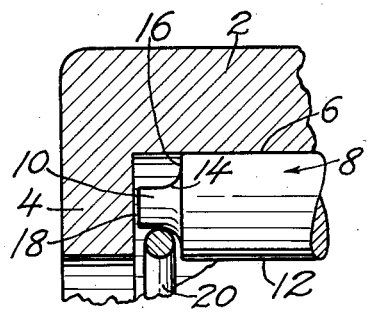
Fig. 2 is an enlarged sectional view of a detail of the construction illustrated in Fig. 1.

In that form of my invention illustrated in Figs. 1 and 2, a race ring 2 is provided with flanges 4 which are located at opposite ends of the race 6 and project radially inward from the race. The rollers are indicated at 8 and are provided with reduced end portions or trunnions 10 that are cylindrical in shape and of smaller diameter than the bearing surfaces 12 of the rollers. The end portions 10 are joined to the body of the bearing by an arcuate surface or radius 14 terminating in a radial shoulder 16. The rollers are slightly shorter than the distance between the flanges 4 at the ends of the race ring so that they may be readily inserted between the flanges leaving a slight clearance 18 between the ends of the rollers and the flanges 4. The flanges thus serve to prevent longitudinal displacement of the rollers and take up end thrust although sufficient clearance is provided to avoid normal frictional contact between the rollers and the flanges 4.

The rollers are held in assembled relation and in engagement with the race 6 by means of a retaining ring 20 which, as shown, is in the form of a split ring of circular cross section. This ring preferably is formed of spring wire and is shaped so that when unsprung its diameter exceeds the diameter of the race 6. However, when compressed and placed in engagement with the reduced end portions 10 of the rollers the ring is of such length that its ends 21 are close together and substantially in contact so that there is no appreciable space between the ends of the ring. When so compressed and applied to the reduced ends of the rollers, the ring serves to urge the rollers outward against the race 6 of the race ring 2. In the preferred construction two retaining rings are employed, one being located in engagement with the reduced portions at each end of the rollers so that both ends of each roller are urged toward the race and the rollers are thus held securely in place and prevented from axial displacement.

The diameter of the wire used in forming the ring 20 is preferably less than the distance between the surfaces of the reduced portions 10 and the cylindrical bearing surfaces 12 of the rollers. The rings 20 therefore will lie below the bearing surface 12 and will not engage the complementary race ring or bearing member to which the assembly is applied. The diameter of the wire also is less than the distance between the shoulders 16 on the rollers and flanges 4 on the race ring so that the retaining ring 20 will bear against the cylindrical surfaces of the reduced end portions of the rollers and will not engage the flange 4 or shoulders 16. The ring 20 therefore is rotatable freely with the rollers while holding them in place.

With this construction the rollers 8 may be readily assembled in place in engagement with the race 6 of the race ring 2 and when a full complement of rollers has been placed in the bearing the spring rings 20 may be compressed and snapped into place in engagement with the cylindrical portions 10 on the reduced ends of the rollers and behind the flanges 4 on the race ring.

Figure 3:
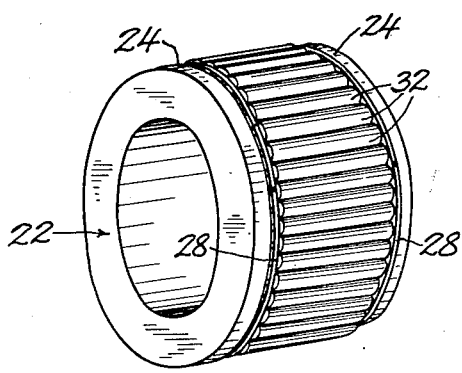
Fig. 3 is a perspective of an alternative embodiment of my invention.
Figure 4:
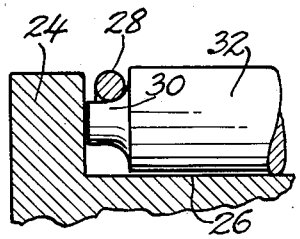
Fig. 4 is an enlarged sectional view of a detail of the construction shown in Fig. 3.

In that form of the invention illustrated in Fig. 3 the rollers are shown as assembled with the inner race ring 22 of a bearing so that they lie on the exterior thereof. The flanges 24 on this race ring project radially outward from the race 26 at opposite ends of the race. The spring retaining rings 28 employed in this construction normally tend to assume a smaller diameter than the race 26 and therefore when placed in engagement with the reduced ends 30 of the rollers 32 they urge the rollers inward toward the race and hold them in place.

In each of the forms of my invention shown and described the race ring can be produced and machined accurately and economically, whereas the rollers may be assembled with the race ring by simply placing them in position between the flanges at the opposite ends of the bearing surface of the race ring. When thus assembled the spring retaining means may be snapped into place whereby the rollers are held against either radial or longitudinal displacement with respect to the race ring. The assembly may then be handled and shipped and the rollers will remain in position so that the bearing may be readily applied to a complementary race ring or bearing member. During operation the retaining rings continue to urge the rollers toward the race with which they were originally assembled while the rings are freely rotated by the reduced ends of the rollers against which they bear. Rotation of the retaining rings further serves to carry lubricant to the rollers and race. Moreover, because of the difference in speed of rotation of the ring and adjacent surfaces of the rollers the rings tend to distribute or spread the lubricant so as to provide improved and automatic lubrication of the elements.

In the event it is desired to remove one or more of the rollers from the assembly, the assembly is separated from the complementary race ring or bearing member with which it is used and the spring retaining means can then be pried out from between the flange on the race ring and the shoulders of the rollers adjacent the reduced ends of the rollers. The rollers are then freed for removal from the assembly and may be readily replaced by other rollers or a complete new set of rollers may be installed in the race ring.

By positioning the retaining means adjacent the ends of the bearings the full length of the bearing between the reduced ends is provided for supporting a load and there are no weak points in the load supporting portion or bearing surfaces of the rollers. For this reason the rollers possess the same strength as those heretofore used in bearing assemblies having fixed or integral retaining mean whereas the cost of the race ring and retaining means are reduced to a minimum and the elements may be produced and assembled and disassembled more readily than has been possible heretofore in devices of this character.

Although I have illustrated and described preferred embodiments of my invention, it will be apparent that various other modifications and changes may be made in the form and construction of bearing assemblies embodying my invention. Therefore it should be understood that the embodiments of my invention herein shown and described are intended to be illustrative only and are not intended to limit the scope of the following claims.

I claim:

1. A roller bearing assembly comprising a race ring, radially extending flanges located on opposite sides of said race ring, a complement of rollers engaging said race ring, each of said rollers having a bearing surface and reduced end portions of a cylindrical shape joined to the bearing surface by an arcuate surface terminating in a radial shoulder, and two spring rings of a circular cross section, one of which is positioned adjacent each of the two opposite ends of said rollers, and engaging said reduced end portions and urging the rollers toward the race ring to prevent radial displacement of the rollers, said spring rings being of less diameter in cross section than the radial distance between the surface of said cylindrical end portions and said bearing surfaces of the rollers and being located between said radially extending shoulders and said flanges.

2. A roller bearing assembly comprising a race ring, radially extending flanges located on opposite sides of said race ring, a complement of rollers engaging said race ring, each of said rollers having a bearing surface and reduced end portions of a cylindrical shape joined to the bearing surface by an arcuate surface terminating in a radial shoulder, and a spring ring of circular cross section engaging said reduced end portions of the rollers and urging the rollers toward the race ring to prevent radial displacement of the rollers, said spring ring having a radius in cross section which is less than the radius of curvature of said arcuate surface whereby said ring has contact with each roller at a single point.

SYDNEY SMITH.

REFERENCES CITED

The following references are of record in the file of this patent:

UNITED STATES PATENTS

| Number | Name | Date |
|---|---|---|
| 1,979,707 | Rydbeck | Nov. 6, 1934 |
| 2,268,745 | Frauenthal | Jan. 6, 1942 |
| 2,334,227 | Stallman | Nov. 16, 1943 |

FOREIGN PATENTS

| Number | Country | Date |
|---|---|---|
| 206,498 | Switzerland | Aug. 15, 1939 |
| 644,700 | France | Oct. 12, 1928 |